United States Patent
Ishikawa et al.

(10) Patent No.: US 12,462,077 B2
(45) Date of Patent: Nov. 4, 2025

(54) SIMULATION DEVICE AND SIMULATION METHOD

(71) Applicant: FUJI CORPORATION, Chiryu (JP)

(72) Inventors: Kohei Ishikawa, Hekinan (JP); Takamitsu Yano, Anjo (JP)

(73) Assignee: FUJI CORPORATION, Chiryu (JP)

( * ) Notice: Subject to any disclaimer, the term of this patent is extended or adjusted under 35 U.S.C. 154(b) by 899 days.

(21) Appl. No.: 17/762,204

(22) PCT Filed: Sep. 27, 2019

(86) PCT No.: PCT/JP2019/038385
§ 371 (c)(1),
(2) Date: Mar. 21, 2022

(87) PCT Pub. No.: WO2021/059534
PCT Pub. Date: Apr. 1, 2021

(65) Prior Publication Data
US 2022/0374566 A1    Nov. 24, 2022

(51) Int. Cl.
*G06F 30/20* (2020.01)
*H05K 13/02* (2006.01)

(52) U.S. Cl.
CPC ............. *G06F 30/20* (2020.01); *H05K 13/02* (2013.01)

(58) Field of Classification Search
CPC ................................ G06F 30/20; H05K 13/02
USPC .......................................................... 703/20
See application file for complete search history.

(56) References Cited

U.S. PATENT DOCUMENTS

2003/0196181 A1* 10/2003 Sano ................... H05K 3/0005
716/111
2016/0353824 A1    12/2016 Maezono et al.
2018/0150340 A1*  5/2018 Chang ................. G06F 11/1004

FOREIGN PATENT DOCUMENTS

JP           11-232339 A      8/1999
WO     WO 2017/033268 A1    3/2017
WO     WO 2018/127956 A1    7/2018

OTHER PUBLICATIONS

Wilson et al. (Simulation and Analysis of a Circuit Board Manufacturing Facility), 8 pages. (Year: 1986).*
International Search Report mailed on Dec. 17, 2019 in PCT/JP2019/038385 filed on Sep. 27, 2019, therein, 2 pages.

* cited by examiner

*Primary Examiner* — Andre Pierre Louis
(74) *Attorney, Agent, or Firm* — Oblon, McClelland, Maier & Neustadt, L.L.P.

(57) ABSTRACT

The simulation device includes a simulation section and a calculation section. A simulation section is configured to simulate an operating status of a board work machine configured to perform predetermined board work on a board and produce a board product, and an operating status of an article moving device configured to supply an article needed for production of the board product to the board work machine based on a production plan of the board product. A calculation section is configured to calculate a production stop time of the board work machine caused by a wait time from when production of the board product by the board work machine is stopped to when the article is supplied by the article moving device based on a result of simulation by the simulation section.

10 Claims, 5 Drawing Sheets

Fig. 8

| PRODUCTION PLAN | OPERATING TIME OF COMPONENT MOUNTER | STOP TIME DUE TO CHANGEOVER | STOP TIME DUE TO SHORTAGE OF COMPONENT | OPERATING TIME OF ARTICLE MOVING DEVICE | FIRST OPERATING RATIO AND SECOND OPERATING RATIO | OTHER DATA |
|---|---|---|---|---|---|---|
| JB1 | TM1 | TW11 | TW21 | TL1 | R11, R21 | D11 |
| JB2 | TM2 | TW12 | TW22 | TL2 | R12, R22 | D12 |
| .. | .. | .. | .. | .. | .. | .. |

SIMULATION DEVICE AND SIMULATION METHOD

TECHNICAL FIELD

The present description discloses the technology relating to a simulation device and a simulation method.

BACKGROUND ART

A component mounting line disclosed in Patent Literature 1 includes a component mounter, a feeder storage, and an exchanging robot. The component mounter mounts a component supplied from a feeder on a board. The feeder storage stores the feeder detachable from the component mounter. The exchanging robot conveys the feeder, and exchanges the feeder between the feeder storage and the component mounter. As a result, in the component mounting line disclosed in Patent Literature 1, it attempts to automate a supply operation of the feeder for supplying the feeder stored in the feeder storage to the component mounter.

PATENT LITERATURE

Patent Literature 1: International Publication No. WO2017/033268

BRIEF SUMMARY

Technical Problem

In the component mounting line disclosed in Patent Literature 1, the component mounter produces a board product while receiving the supply of the feeder by the exchanging robot. However, there is a possibility that the component mounter stops the production of the board product in order to receive the supply of the feeder by the exchanging robot. Therefore, it is demanded to grasp a production stop time of the component mounter caused by a wait time from when the production of the board product by the component mounter is stopped to when the feeder is supplied by the exchanging robot.

In view of such a circumstance, the present description discloses a simulation device and a simulation method that can calculate a production stop time of a board work machine caused by a wait time from when production of a board product by the board work machine is stopped to when an article is supplied by an article moving device.

Solution to Problem

The present description discloses a simulation device including a simulation section and a calculation section. The simulation section is configured to simulate an operating status of a board work machine configured to perform predetermined board work on a board and produce a board product, and an operating status of an article moving device configured to supply an article needed for production of the board product to the board work machine based on a production plan of the board product. The calculation section is configured to calculate a production stop time of the board work machine caused by a wait time from when production of the board product by the board work machine is stopped to when the article is supplied by the article moving device based on a result of simulation by the simulation section.

In addition, the present description discloses a simulation method including a simulation step and a calculation step. In the simulation step, an operating status of a board work machine configured to perform predetermined board work on a board and produce a board product, and an operating status of an article moving device configured to supply an article needed for production of the board product to the board work machine is simulated based on a production plan of the board product. In the calculation step, a production stop time of the board work machine caused by a wait time from when production of the board product by the board work machine is stopped to when the article is supplied by the article moving device is calculated based on a result of simulation in the simulation step.

Advantageous Effects

A simulation device includes a simulation section and a calculation section. Accordingly, the simulation device can calculate a production stop time of a board work machine caused by a wait time from when production of a board product by the board work machine is stopped to when an article is supplied by an article moving device. It is possible to similarly apply the above description of the simulation device to the simulation method.

BRIEF DESCRIPTION OF DRAWINGS

FIG. 8 is a schematic view showing an example of a result of calculation by a calculation section.

DESCRIPTION OF EMBODIMENTS

1. Embodiment

1-1. Configuration Example of Board Production Line 1

Figure 1:
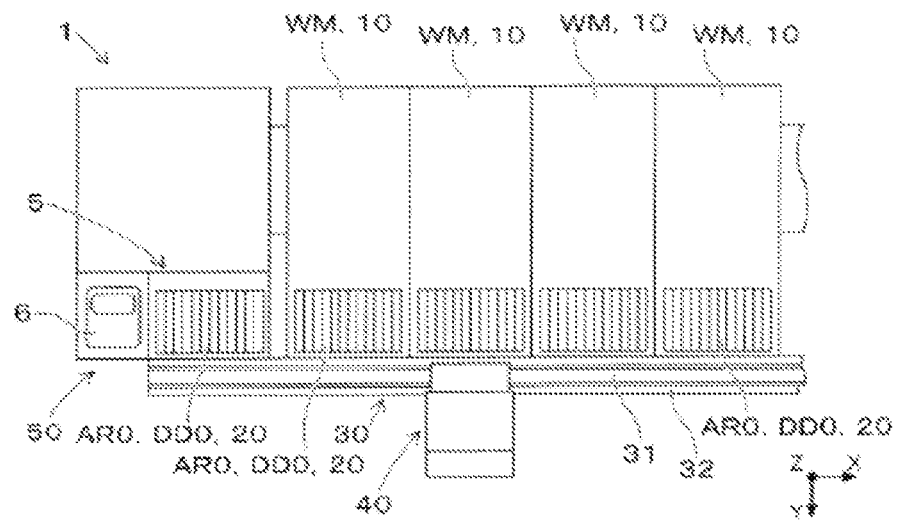
FIG. 1 is a plan view showing a configuration example of a board production line.

As shown in FIG. 1, board production line 1 includes at least one (four in FIG. 1) component mounter 10, exchange system 30, article moving device 40, storage device 5, and line control computer 6. Four component mounters 10 are installed along a conveyance direction of board 90 shown in FIG. 2. Component mounter 10 is included in board work machine WM that performs predetermined board work on board 90. The board work by component mounter 10 includes a carrying-in operation and a carrying-out operation of board 90, a pick-up operation and a mounting operation of a component, and the like. Component mounter 10 is detachably provided with, for example, cassette-type feeder 20.

Storage device 5 used, for example, for storing feeder 20 is installed on a board carrying-in side (on a paper left side of FIG. 1) of board production line 1. In addition, board production line 1 is provided with exchange system 30 and article moving device 40, and performs a replenishment operation, an exchange operation, and a collection operation of feeder 20. It should be noted that a configuration of board production line 1 can be appropriately added or changed depending on, for example, a type of a board product to be produced. Specifically, for example, board work machine WM, such as a solder printing machine, an inspection machine, or a reflow furnace, can be appropriately installed in board production line 1.

Each device constituting board production line 1 is configured to be able to input and output various data to and from line control computer 6 via a network. For example, storage device 5 includes multiple slots. Storage device 5 stores feeder 20 equipped in multiple slots. Feeder 20 equipped in the slot of storage device 5 is placed in a state capable of communicating with line control computer 6. As a result, the slot of storage device 5 and an identification code of feeder 20 equipped in the slot are recorded in line control computer 6 in association with each other.

In addition, line control computer 6 monitors an operation status of board production line 1, and integrally controls board work machine WM, such as component mounter 10, exchange system 30, article moving device 40, and storage device 5. Various data for controlling board work machine WM, exchange system 30, article moving device 40, and storage device 5 are stored in line control computer 6. Line control computer 6 transmits various data, such as a control program, when, for example, component mounter 10 executes a mounting process of the component.

1-2. Configuration Example of Component Mounter 10

Figure 2:
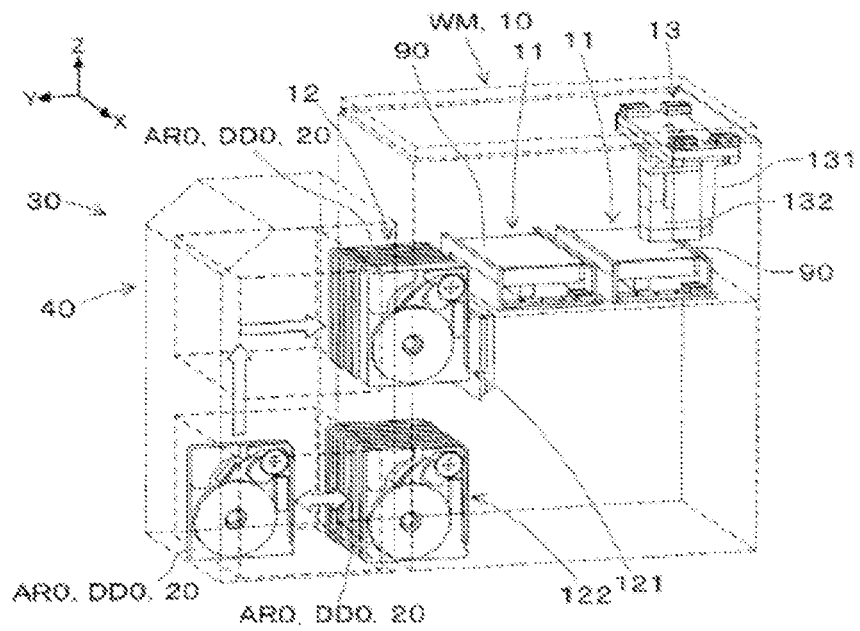
FIG. 2 is a perspective view showing a schematic configuration of an exchange system and a component mounter in FIG. 1.

As shown in FIG. 2, each of four component mounters 10 includes board conveyance device 11, component supply device 12, and head driving device 13. In the following description, it is assumed that a horizontal width direction of component mounter 10, which is the conveyance direction of board 90, is an X-direction, a horizontal depth direction of component mounter 10 is a Y-direction, and a vertical direction (paper up-down direction of FIG. 2) perpendicular to the X-direction and the Y-direction is a Z-direction.

Board conveyance device 11 is configured by, for example, a belt conveyor and a positioning device. Board conveyance device 11 sequentially conveys board 90 in the conveyance direction, and positions board 90 at a predetermined position in the device. Board conveyance device 11 carries board 90 out of component mounter 10 after the mounting process by component mounter 10 is terminated.

Component supply device 12 supplies the component to be mounted on board 90. Component supply device 12 includes first slot 121 and second slot 122 that can be equipped with multiple feeders 20. In the present embodiment, first slot 121 is disposed in an upper part of a front side of component mounter 10 to hold equipped feeder 20 in an operable manner. An operation of feeder 20 equipped in first slot 121 is controlled in the mounting process by component mounter 10 to supply the component in an extraction section provided at a defined position on an upper part of feeder 20.

In the present embodiment, second slot 122 is disposed below first slot 121 to store equipped feeder 20. That is, second slot 122 preliminarily holds feeder 20 used for production, or temporarily holds used feeder 20 used for production. It should be noted that the exchange operation of feeder 20 between first slot 121 and second slot 122 is performed by article moving device 40.

In addition, when feeder 20 is equipped in first slot 121 or second slot 122 of component supply device 12, electric power is supplied from component mounter 10 via a connector. Moreover, feeder 20 is placed in a state capable of communicating with component mounter 10. Feeder 20 equipped in first slot 121 controls a feeding operation of a carrier tape accommodating the component based on a control instruction or the like by component mounter 10. As a result, feeder 20 supplies the component in the extraction section provided in the upper part of feeder 20 so as to be able to be picked up by a holding member of mounting head 132.

Head driving device 13 moves moving body 131 in the horizontal direction (X-direction and Y-direction) by a linear motion mechanism. Mounting head 132 is fixed to moving body 131 by a clamp member in an exchangeable (detachable) manner. Mounting head 132 is moved in the XY-directions integrally with moving body 131 by the linear motion mechanism of head driving device 13. Mounting head 132 picks the component supplied by component supply device 12 up by the holding member. As the holding member, for example, a suction nozzle that picks the component up by supplied negative pressure air, a chuck that grips the component, or the like can be used.

Mounting head 132 holds the holding member so as to be movable in the Z-direction and to be rotatable around a Q-axis parallel to the Z-axis. Mounting head 132 adjusts a position and an angle of the holding member depending on a posture of the picked up component. Moreover, mounting head 132 mounts the component to a mounting position of board 90 as instructed by the control program. A total time of a time required for a predetermined number of cycles of a pick-and-place cycle of the component and a time required for carrying board 90 in and out is a cycle time per board 90.

It should be noted that the holding member provided in mounting head 132 can be appropriately changed depending on a type of component in the mounting process of mounting the component on board 90. Component mounter 10 attaches the suction nozzle accommodated in a nozzle station to mounting head 132, for example, in a case in which the suction nozzle used in the mounting process to be executed is not attached to mounting head 132. The nozzle station is detachably equipped in a predetermined position in component mounter 10.

1-3. Configuration Example of Feeder 20

Figure 3:
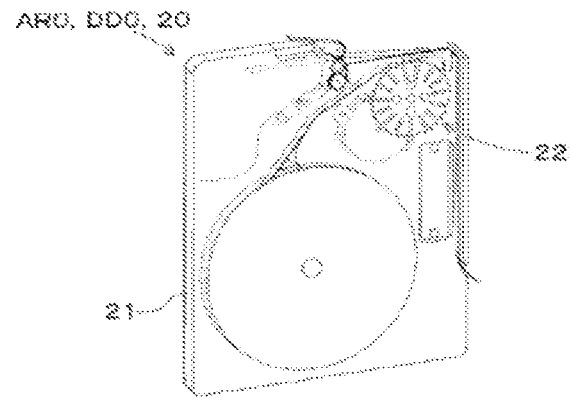
FIG. 3 is a perspective view showing an external appearance of a feeder shown in FIG. 2.

As shown in FIG. 3, feeder 20 includes feeder main body 21 and driving device 22. Feeder main body 21 of the present embodiment is formed in a flat box shape. Feeder main body 21 holds a reel on which the carrier tape accommodating a large number of components is wound in a detachable (exchangeable) manner. Driving device 22 includes a sprocket that engages a feeding hole provided in the carrier tape. Driving device 22 rotates the sprocket to feed and move the carrier tape.

An operation of driving device 22 of feeder 20 is controlled by a control device (not shown). When feeder 20 is equipped in first slot 121 of component mounter 10, feeder 20 receives the electric power supplied from component mounter 10 via the connector. As a result, the control device of feeder 20 is placed in a state capable of communicating with component mounter 10. It is also possible to similarly apply the above description of first slot 121 to second slot 122. As a result, component mounter 10 can detect the replenishment and the collection of feeder 20 in first slot 121 and second slot 122.

1-4. Configuration Examples of Exchange System 30 and Article Moving Device 40

As shown in FIG. 1 and FIG. 2, exchange system 30 includes first rail 31 and second rail 32. First rail 31 and second rail 32 form a traveling path of article moving device 40. First rail 31 is provided along an arrangement direction of four component mounters 10, and is provided between first slot 121 and second slot 122 in the up-down direction (Z-direction). Second rail 32 is provided along the arrangement direction of four component mounters 10, and is provided below second slot 122 in the up-down direction (Z-direction). First rail 31 and second rail 32 extend over substantially the entire area in the conveyance direction of board 90 in board production line 1.

Article moving device 40 is provided so as to be able to travel along the traveling path formed by first rail 31 and second rail 32. Article moving device 40 receives the electric power supplied from a power transmission section by non-contact power supply, for example, via a power receiving section provided to face the power transmission section provided in first rail 31. The electric power received by the power receiving section is used for traveling of article moving device 40, a predetermined operation, or the like via a power receiving circuit. It should be noted that article moving device 40 detects, for example, a position (current position) on the traveling path by a position detection device. As the position detection device, for example, an optical detection method, a detection method using electromagnetic induction, or the like can be applied.

The "predetermined operation" includes an exchange operation for exchanging device DD0 detachably provided in board work machine WM, such as component mounter 10, with board work machine WM. In the present embodiment, article moving device 40 uses feeder 20 that supplies the component to be mounted on board 90 as device DD0, and performs the exchange operation of feeder 20 with component mounter 10, which is board work machine WM, and storage device 5.

In the present embodiment, article moving device 40 conveys feeder 20 from storage device 5 to first slot 121 or second slot 122 of component mounter 10, and performs the replenishment operation of feeder 20. In addition, article moving device 40 performs the exchange operation of feeder 20 between first slot 121 and second slot 122 of component mounter 10. Further, article moving device 40 conveys feeder 20, which is no longer needed, from component mounter 10 to storage device 5, and performs the collection operation of feeder 20.

Figure 4:
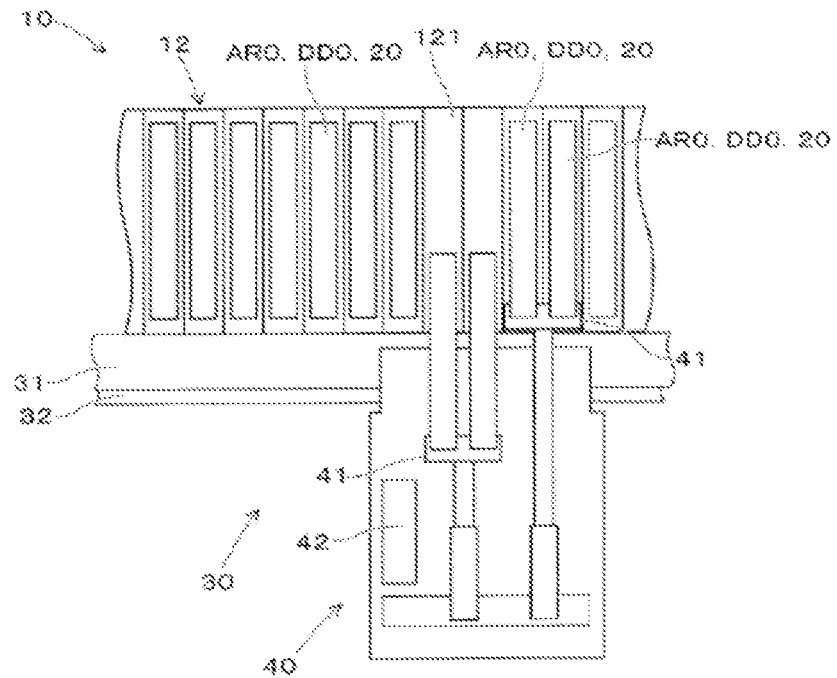
FIG. 4 is a plan view showing an example of an exchange operation of the feeder between an article moving device and a component supply device of the component mounter.

As shown in FIG. 4, article moving device 40 includes at least one (two in FIG. 4) holding section 41 and control device 42. In the present embodiment, each of two holding sections 41 can simultaneously clamp multiple (two in FIG. 4) feeders 20, and can simultaneously hold multiple (two) feeders 20. In addition, each of two holding sections 41 is independently movable along an attachment/detachment direction (Y-direction in the present embodiment) of feeder 20 by, for example, the linear motion mechanism or the like, and can simultaneously move multiple (two) feeders 20 along the Y-direction.

Further, two holding sections 41 are integrally movable in the up-down direction (Z-direction) by, for example, the linear motion mechanism or the like, and can simultaneously move multiple (four) feeders 20 in the Z-direction. It should be noted that article moving device 40 can include, for example, multiple (four) holding sections 41. In this case, each of multiple (four) holding sections 41 clamps one feeder 20, so that multiple (four) feeders 20 can be moved independently in the Y-direction and the Z-direction. In addition, a form of holding section 41 is not limited to the clamp mechanism and the linear motion mechanism, and can have various forms. For example, holding section 41 can include a protruding portion that can be fitted into a hole portion provided in feeder 20. In this case, feeder 20 is held by fitting the protruding portion of holding section 41 into the hole portion of feeder 20.

Control device 42 includes a well-known computing device and a memory device, in which a control circuit is configured (all not shown). Control device 42 is connected to four component mounters 10, exchange system 30, storage device 5, and line control computer 6 in a communicable manner. Control device 42 controls the traveling of article moving device 40, the operations of two holding sections 41, and the like. With the configuration described above, article moving device 40 can be moved to a predetermined position along first rail 31 and second rail 32, and can perform the exchange operation of feeder 20 at a stopping position.

1-5. Configuration Example of Simulation Device 50

In board production line 1, component mounter 10 produces the board product while receiving the supply of feeder 20 by article moving device 40. However, there is a possibility that component mounter 10 stops the production of the board product in order to receive the supply of feeder 20 by article moving device 40. Accordingly, there is a demand to grasp production stop time TW0 of component mounter 10 caused by the wait time from when the production of the board product by component mounter 10 is stopped to when feeder 20 is supplied by article moving device 40. Accordingly, in the present embodiment, simulation device 50 is provided.

Figure 5:
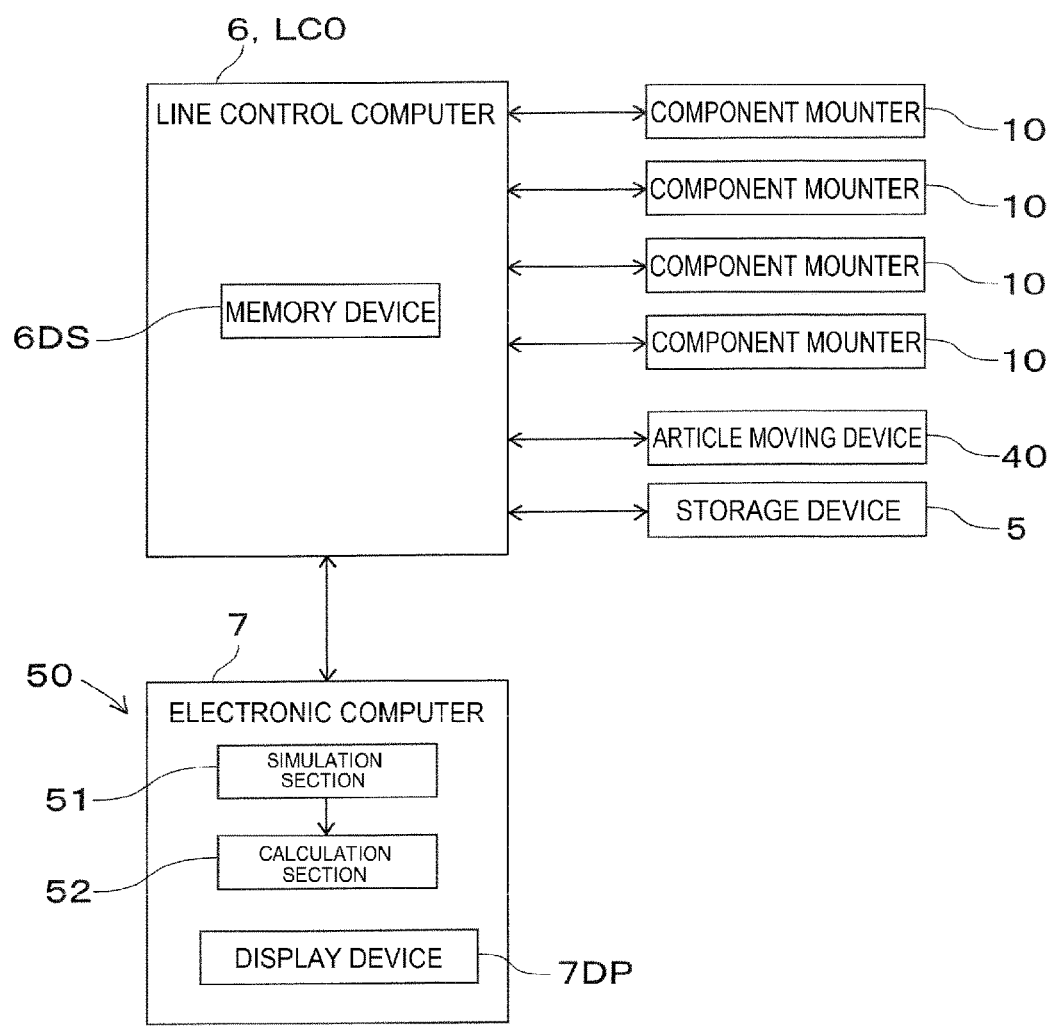
FIG. 5 is a block diagram showing an example of a control block of a simulation device.

Simulation device 50 can be provided in various electronic computers, control devices, and the like. As shown in FIG. 5, simulation device 50 according to the present embodiment is provided in electronic computer 7. Electronic computer 7 includes a well-known computing device, a memory device, an input device, and an output device. Simulation device 50 can be formed, for example, on line control computer 6, a host computer that manages multiple board production lines 1, a cloud, or the like.

In addition, as shown in FIG. 5, simulation device 50 includes simulation section 51 and calculation section 52 when viewed as a control block. Simulation device 50 executes computing processing according to the flowchart shown in FIG. 6. Simulation section 51 performs the processing and determination shown in steps S11 to S16. Calculation section 52 performs the processing shown in step S17.

1-5-1. Simulation Section 51

Figure 6:
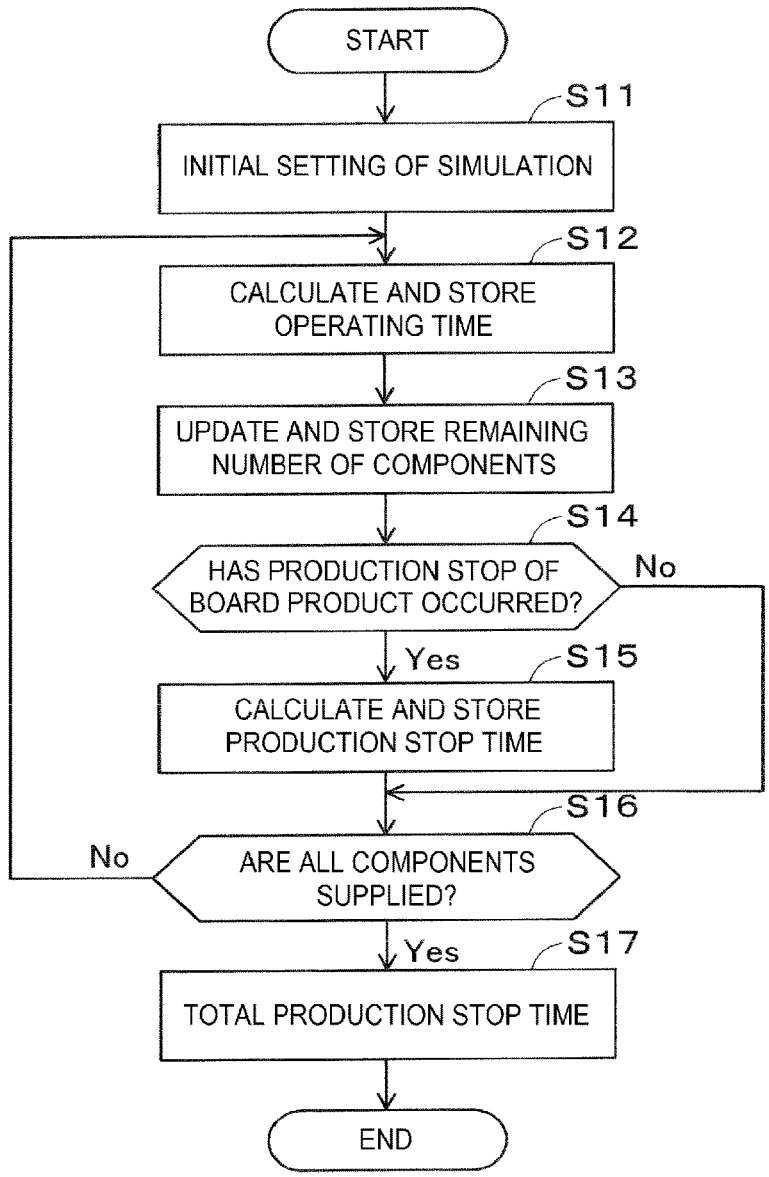
FIG. 6 is a flowchart showing an example of a simulation procedure by the simulation device.

Simulation section 51 simulates an operating status of board work machine WM that performs predetermined board work on board 90 to produce the board product, and an operating status of article moving device 40 that supplies article AR0 needed for the production of the board product to board work machine WM, based on the production plan of the board product (steps S11 to S16 shown in FIG. 6).

As shown in FIG. 1, board production line 1 according to the present embodiment includes board work machine WM including component mounter 10, article moving device 40, and storage device 5. Storage device 5 can store, in addition to feeder 20, article AR0 needed for the production of the board product by board work machine WM. For example, device DD0 detachably provided in board work machine WM is included in article AR0.

In a case in which board work machine WM is component mounter 10, for example, feeder 20, the reel or a component tray that accommodates multiple components, mounting head 132, the holding member (suction nozzle, chuck, or the like), the nozzle station, and the like are included in device DD0. In a case in which board work machine WM is a solder printing machine that prints solder on board 90, for example, a solder cup, a mask, a squeegee, a dispense head, and the like are included in device DD0. In a case in which board work machine WM is an inspection machine, for example, an inspection head and the like are included in device DD0. The inspection machine includes a solder inspection machine that inspects solder printed on board 90, an appearance inspection machine that inspects a component mounted on board 90, and the like.

Similarly, article moving device 40 can supply, in addition to feeder 20, article AR0 stored in storage device 5 to board work machine WM, and collect article AR0, which is no longer needed in board work machine WM, in storage device 5. In addition, in the present embodiment, component mounter 10 that is board work machine WM includes first slot 121 and second slot 122. Another board work machine WM can also include first slot 121 and second slot 122, and article AR0 to be held is not limited to feeder 20.

That is, board work machine WM can include first slot 121 that holds article AR0 needed for the production of the board product in an exchangeable manner, and second slot 122 that can preliminarily hold article AR0 or can temporarily hold article AR0 to be collected. Article moving device 40 can perform the exchange operation of article AR0 between first slot 121 and second slot 122.

In addition, as shown in FIG. 5, line control computer 6 includes memory device 6DS. As memory device 6DS, for example, a magnetic memory device such as a hard disk device, a memory device using a semiconductor element, such as a flash memory, or the like can be used. Memory device 6DS stores a production plan of the board product.

Simulation section 51 can acquire the production plan from management device LC0 that manages the production plan, and can perform the simulation based on the acquired production plan. In the present embodiment, line control computer 6 corresponds to management device LC0. As a result, simulation section 51 can easily set the production plan included in a simulation condition.

In addition, simulation section 51 can also cause an operator to input the production plan, and perform the simulation based on the production plan input by the operator. In this case, the operator can individually set the production plan included in the simulation condition, and also can easily change the simulation condition. It should be noted that simulation section 51 may acquire the production plan from management device LC0, cause the operator to change a part of the acquired production plan, and may set the simulation condition including the production plan.

In any case, the production plan of the board product includes at least a type and a production scheduled number of the board products, and a type and a needed number of articles AR0. Board work machine WM produces the board product while receiving the supply of article AR0 by article moving device 40. Accordingly, in order for simulation section 51 to simulate the operating status of board work machine WM and the operating status of article moving device 40, at least the information described above is needed as the simulation condition.

In addition, for example, board production line 1 shown in FIG. 1 includes four component mounters 10. Since board 90 is sequentially conveyed to four component mounters 10, the production time of the board product by component mounter 10 is affected by component mounter 10 having the longest production time among four component mounters 10. Similarly, the production time of the board product is affected by a solder printing machine, a solder inspection machine, or the like on the upstream side. In addition, the production time of the board product is affected by a reflow furnace, an appearance inspection machine, or the like on the downstream side. Accordingly, the simulation condition may include the production required time of board work machine WM that becomes a bottleneck. For example, in a case in which board work machine WM is component mounter 10, the production required time can be represented by using a cycle time.

Further, for example, production stop time TW0 of component mounter 10 occurring by the changeover differs between a case in which the changeover is started after the production of all four component mounters 10 is stopped and a case in which the changeover is started from component mounter 10 on which the changeover is enabled. Accordingly, the simulation condition may include a method of changeover of board work machine WM. It should be noted that the changeover is performed, for example, when the production plan of the board product is switched, a configuration of each device of board work machine WM (including article AR0) is changed as needed, and a control program for driving and controlling board work machine WM is changed as needed.

In addition, for example, there is a case in which the notice of the supply of article AR0 is given before article AR0 is needed for the production of the board product, and article AR0 can be preliminarily held in second slot 122 of board work machine WM. In this case, there is a possibility that the type and the number of article AR0 that can be prepared in second slot 122 in advance are changed and the operating status of board work machine WM and the operating status of article moving device 40 are changed due to a time difference between the scheduled time during which article AR0 is needed for the production of the board product and the notice time during which the notice of the supply of article AR0 is given. Accordingly, the simulation condition may include the notice time during which the notice of the supply of article AR0 is given.

It is also possible to similarly apply the above description to the shortage of the supply supplied from article AR0. For example, in a case in which article AR0 is feeder 20, a component accommodated in a carrier tape wound on a reel corresponds to the supply. In this case, the simulation condition may include the notice time during which the notice of the shortage of the component supplied from feeder 20 is given. It is also possible to similarly apply the above description to a case in which article AR0 is a component tray, a nozzle station, a solder cup, or the like, for example.

In addition, the scheduled time needed for the production of the board product by article AR0 to be supplied is changed depending on an initial value of the remaining number of the supplies supplied from article AR0. Accordingly, the simulation condition may include the initial value of the remaining number of the supplies supplied from article AR0. It should be noted that in a case in which article AR0 is feeder 20 and the supply is the component, the initial value of the remaining number of the supplies can be set, for example, for each tape width of the carrier tape. As the tape width is increased, the size of the accommodated component is increased, so that the number of accommodated components tends to be decreased.

In addition, for example, there is a possibility that an order of use, the frequency of use, and the like of device DD0 are changed depending on the initial disposition of device DD0 detachably provided in board work machine WM in first slot 121 and second slot 122. Accordingly, the simulation condition may include the initial disposition of device DD0 detachably provided in board work machine WM in first slot 121 and second slot 122. By including at least one of the matters described above in the simulation condition, simulation section 51 can perform the simulation close to the actual operating status of board work machine WM and the operating status of article moving device 40.

Simulation section 51 simulates the operating status of board work machine WM and the operating status of article moving device 40 based on the simulation condition including the production plan of the board product. First, simulation section 51 performs initial setting of the simulation (step S11 shown in FIG. 6). The initial setting includes the setting of the simulation condition described above, the supply plan of article AR0 and the supply plan of the supplies supplied from article AR0, the creation of the collection plan of article AR0, which is no longer needed, and the like.

In the present embodiment, simulation section 51 creates the supply plan of feeder 20 that is article AR0, the supply plan of the component supplied from feeder 20, and the collection plan of feeder 20, which is no longer needed. The supply plan of the component includes feeder 20 that supplies the component, a holding member that picks the component up, a mounting position on board 90 on which the component is mounted, an order of supplying the component (order of mounting the component on board 90), the supply number of the component, and the like. The supply plan of the component is optimized such that the cycle time is optimized based on the production plan of the board product. A method of optimization is not limited, and a well-known method can be used.

The supply plan or the collection plan of feeder 20 includes component mounter 10 that performs the supply or the collection, a position in first slot 121 or second slot 122, the timing and the order of supplying or collecting feeder 20, the number of feeders 20, and the like. The supply plan or the collection plan of feeder 20 is optimized such that, for example, the number of feeders 20 to be supplied or collected at once, the movement amount of article moving device 40, the number of movements, and the like are optimized. A method of optimization is not limited, and a well-known method can be used.

Next, simulation section 51 sequentially executes the supply plan of article AR0, the supply plan of the supply, and the collection plan of article AR0, and stores the execution time needed to execute these plans in the memory device of electronic computer 7 (step S12). In addition, simulation section 51 calculates the remaining number of the supplies supplied from article AR0, and stores the remaining number of supplies in the memory device (step S13). In the present embodiment, simulation section 51 calculates the required time (operating time of component mounter 10) each time the component is supplied by component mounter 10 and the component is mounted on board 90, and stores the calculated required time in the memory device. Simulation section 51 calculates the required time (operating time of article moving device 40) each time the supply operation, the exchange operation, the collection operation, or the like of feeder 20 is performed, and stores the calculated required time in the memory device. In addition, each time the component is supplied from feeder 20, the remaining number of the components is reduced and stored in the memory device. When the remaining number of the components is zero, the shortage of the component to be supplied occurs.

In addition, simulation section 51 determines whether the production stop of the board product caused by the wait time (described below) has occurred (step S14). In the present embodiment, simulation section 51 can determine that the production stop of the board product by component mounter 10 has occurred in a case in which feeder 20 needed for the production of the board product is not equipped in first slot 121 (occurrence of the changeover). In addition, simulation section 51 can determine that the production stop of the board product by component mounter 10 has occurred in a case in which the remaining number of the components supplied from feeder 20 equipped in first slot 121 is zero (shortage of the component or shortage of feeder 20).

In a case in which the production stop of the board product has occurred (Yes in step S14), simulation section 51 calculates production stop time TW0 of board work machine WM, and stores production stop time TW0 in the memory device (step S15). In a case in which the production of the board product continues (No in step S14), simulation section 51 does not execute the processing shown in step S15. Next, simulation section 51 determines whether all the supplies (components) included in the supply plan have been supplied (step S16).

In a case in which all the supplies (components) included in the supply plan are supplied (Yes in step S16), calculation section 52 totals production stop time TW0 of board work machine WM (step S17). In a case in which all the supplies (components) included in the supply plan have not been supplied (No in step S16), the control returns to the processing shown in step S12, and the processing and determination shown in steps S12 to S16 are repeated until all the supplies (components) included in the supply plan are supplied.

1-5-2. Calculation Section 52

Based on a result of simulation by simulation section 51, calculation section 52 calculates production stop time TW0 of board work machine WM caused by the wait time from when the production of the board product by board work machine WM is stopped to when article AR0 is supplied by article moving device 40 (step S17 shown in FIG. 6).

As described above, board work machine WM includes first slot 121 that holds article AR0 used for production of the board product in an exchangeable manner, and second slot 122 that can preliminarily hold article AR0 or can temporarily hold article AR0 to be collected. In addition, article moving device 40 performs the exchange operation of article AR0 between first slot 121 and second slot 122. In such board production line 1, production stop time TW0 of board work machine WM caused by the wait time differs depending on whether second slot 122 holds article AR0 before the production of the board product by board work machine WM is stopped.

In a case in which second slot 122 holds article AR0 before the production of the board product by board work machine WM is stopped, calculation section 52 can calculate production stop time TW0 based on carrying-out time TC0 and first supply time TF0. Carrying-out time TC0 means a time needed from when the production of the board product by board work machine WM is stopped to when article moving device 40 carries article AR0, which is no longer needed in board work machine WM, out of first slot 121. In addition, first supply time TF0 means a time from when article moving device 40 starts carrying-out of article AR0 held in second slot 122 to when article moving device 40 carries article AR0 into first slot 121.

Figure 7:
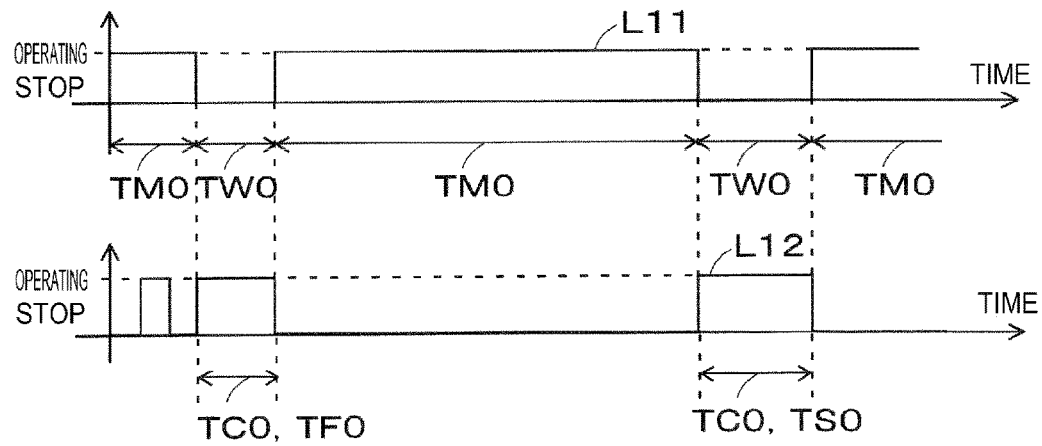
FIG. 7 is a schematic view showing an example of a relationship among a carrying-out time, a first supply time, a second supply time, an operating time, and a production stop time.

FIG. 7 shows an example of a relationship among carrying-out time TC0, first supply time TF0, second supply time TS0, operating time TM0, and production stop time TW0. Polygonal line L11 shows an example of the result of simulation of the operating status of board work machine WM. The horizontal axis represents a time, and the vertical axis represents an "operating" state in which board work machine WM is operated, or a "stopping" state in which board work machine WM stops the production of the board product. It should be noted that operating time TM0 is an operating time of board work machine WM, and is a time during which board work machine WM produces the board product.

Polygonal line L12 shows an example of the result of simulation of the operating status of article moving device 40. The horizontal axis represents a time, and the vertical axis represents an "operating" state in which article moving device 40 is operated, or a "stopping" state in which article moving device 40 is stopped. Article moving device 40 has a time of being operated for preliminarily holding article AR0 in second slot 122 during operating time TM0 of board work machine WM. Specifically, before the production of the board product by board work machine WM is stopped, article moving device 40 starts the acquisition operation of article AR0 stored in storage device 5, conveys acquired article AR0 to board work machine WM to which article is to be supplied, and carries article AR0 into second slot 122 of board work machine WM.

Then, when the production of the board product by board work machine WM is stopped, article moving device 40 carries article AR0, which is no longer needed in board work machine WM, out of first slot 121. In addition, article moving device 40 carries article AR0 held in second slot 122 out, and carries article AR0 into first slot 121. In this case, production stop time TW0 of board work machine WM corresponds to a time obtained by adding carrying-out time TC0, first supply time TF0, and the required time from when article AR0 is carried into first slot 121 to when board work machine WM actually starts the production of the board product.

For example, since there is no space in second slot 122, second slot 122 may not be able to hold article AR0 before the production of the board product by board work machine WM is stopped. In this case, calculation section 52 can calculate production stop time TW0 based on carrying-out time TC0 and second supply time TS0. Second supply time TS0 means a time from when article moving device 40 starts the acquisition operation of article AR0 stored in storage device 5 to when acquired article AR0 is conveyed to board work machine WM to which the article is to be supplied and article AR0 is carried into first slot 121 of board work machine WM.

In this case, article moving device 40 acquires article AR0 stored in storage device 5 after the production of the board product by board work machine WM is stopped. Specifically, when the production of the board product by board work machine WM is stopped, article moving device 40 carries article AR0, which is no longer needed in board work machine WM, out of first slot 121. In addition, article moving device 40 acquires article AR0 stored in storage device 5, conveys acquired article AR0 to board work machine WM to which the article is to be supplied, and carries article AR0 into first slot 121 of board work machine WM. In this case, production stop time TW0 of board work machine WM corresponds to a time obtained by adding carrying-out time TC0, second supply time TS0, and the required time from when article AR0 is carried into first slot 121 to when board work machine WM actually starts the production of the board product.

It should be noted that, in any case, article AR0 carried out of first slot 121 can be conveyed from board work machine WM to storage device 5 by article moving device 40 to perform the collection operation. In addition, in a case in which article moving device 40 cannot perform the collection operation, article AR0 carried out of first slot 121 is carried into second slot 122. Second slot 122 can temporarily hold article AR0 carried out of first slot 121.

The factor of the stop the production of the board product by board work machine WM is not limited. For example, the stop of the production of the board product by board work machine WM occurs due to the shortage of article AR0 or the changeover in board work machine WM. In the present embodiment, the stop of the production of the board product by component mounter 10 occurs due to the shortage of feeder 20 in component mounter 10 (shortage of the component supplied from feeder 20) or the changeover.

FIG. 8 shows an example of a result of calculation by calculation section 52. In FIG. 8, operating time TM0 of component mounter 10, production stop time TW0 of component mounter 10 due to the changeover, production stop time TW0 of component mounter 10 due to the shortage of component, the operating time of article moving device 40, the first operating ratio and the second operating ratio, and other data are schematically shown for each production plan.

In the present embodiment, calculation section 52 totals operating time TM0 of component mounter 10 based on the result of simulation by simulation section 51. Operating time TM0 of component mounter 10 in production plan JB1 is indicated by operating time TM1. Operating time TM0 of component mounter 10 of production plan JB2 is indicated by operating time TM2.

In addition, calculation section 52 totals production stop time TW0 of component mounter 10 due to the changeover based on the result of simulation by simulation section 51. Production stop time TW0 of component mounter 10 of production plan JB1 is indicated by stop time TW11. Production stop time TW0 of component mounter 10 of production plan JB2 is indicated by stop time TW12. In addition, calculation section 52 totals production stop time TW0 of component mounter 10 due to the shortage of the component (shortage of feeder 20) based on the result of simulation by simulation section 51. Production stop time TW0 of component mounter 10 in production plan JB1 is indicated by stop time TW21. Production stop time TW0 of component mounter 10 of production plan JB2 is indicated by stop time TW22.

Calculation section 52 can also calculate the operating time of article moving device 40. In the present embodiment, calculation section 52 totals the operating time of article moving device 40 based on the result of simulation by simulation section 51. The operating time of article moving device 40 of production plan JB1 is indicated by operating time TL1. The operating time of article moving device 40 of production plan JB2 is indicated by operating time TL2.

It should be noted that the operating time of article moving device 40 includes an operating time due to the shortage of the component (shortage of feeder 20). The operating time of article moving device 40 includes an operating time due to the changeover. The operating time of article moving device 40 includes an operating time for causing second slot 122 to preliminarily hold feeder 20. The operating time of article moving device 40 includes an operating time for collecting only feeder 20, which is no longer needed. The operating time of article moving device 40 includes an operating time of a retraction operation for avoiding interference with other devices. Calculation section 52 can calculate the operating time of article moving device 40 for each operating time described above.

Calculation section 52 can also calculate the first operating ratio of board work machine WM when production stop time TW0 is zero and the second operating ratio of board work machine WM at calculated production stop time TW0. The first operating ratio and the second operating ratio refer to the capability with which board work machine WM can continue to operate, and indicate the availability. That is, the first operating ratio and the second operating ratio are indicated by a ratio of a time during which the board product can be produced to a total time of a time during which board work machine WM can produce the board product and a time during which the board product cannot be produced. By calculating the first operating ratio and the second operating ratio by calculation section 52, the availability can be quantified, so that a user of simulation device 50 can easily grasp the influence of production stop time TW0.

In the present embodiment, calculation section 52 calculates the first operating ratio and the second operating ratio of component mounter 10 based on the result of simulation by simulation section 51. The first operating ratio of component mounter 10 in production plan JB1 is indicated by operating ratio R11, and the second operating ratio of component mounter 10 in production plan JB1 is indicated by operating ratio R21. The first operating ratio of component mounter 10 in production plan JB2 is indicated by operating ratio R12, and the second operating ratio of component mounter 10 in production plan JB2 is indicated by operating ratio R22.

Calculation section 52 can acquire comparative data for a case in which the worker supplies article AR0 needed for the production of the board product to board work machine WM in the board production line in which article moving device 40 is not provided. Specifically, calculation section 52 acquires, as the comparative data, the production stop time of board work machine WM caused by the wait time from when the production of the board product by board work machine WM is stopped to when article AR0 is supplied by the worker. As a result, the user of simulation device 50 can easily compare production stop time TW0 of board work machine WM, and can easily grasp the effect of article moving device 40.

It should be noted that the required time needed for the supply operation of article AR0 by the worker can be acquired, for example, based on an actual measurement value when the worker actually performs the supply operation of article AR0. In addition, normally, the required time needed for the supply operation of article AR0 by the worker varies. Therefore, calculation section 52 can also calculate an average value, a mode value, or the like of the actual measurement value when multiple workers actually perform the supply operation of article AR0.

In addition, calculation section 52 can calculate the performance of board work machine WM, the overall equipment effectiveness, and the like. The performance of board work machine WM indicates the actual capability of board work machine WM with respect to the specification. In addition, the overall equipment effectiveness is calculated by multiplying the operating ratio (the first operating ratio and the second operating ratio) described above, the performance, and the quality of board work machine WM. By comparing the overall equipment effectiveness (ideal effectiveness) of 100% with the actual overall equipment effectiveness, it is possible to extract a generation source of loss, a type of loss, and the like in a production process of the board product. Other data shown in FIG. 8 include the information described above. The data of production plan JB1 is indicated by data D11. The data of production plan JB2 is indicated by data D12.

Simulation device 50 can output the result of calculation calculated by calculation section 52 by various methods. Simulation device 50 can output (for example, display on display device 7DP) production stop time TW0 calculated by calculation section 52 by, for example, using an output device of electronic computer 7 (for example, display device 7DP shown in FIG. 5). It is also possible to similarly apply the above description of production stop time TW0 to the first operating ratio, the second operating ratio, the operating time of article moving device 40, the production stop time of the comparative data, and other data.

2. Others

As shown in FIG. 1, in the present embodiment, storage device 5 is provided in board production line 1, and article moving device 40 can travel along a traveling path formed by first rail 31 and second rail 32 of exchange system 30. However, storage device 5 and article moving device 40 are not limited to the forms described above, and can take various forms. For example, storage device 5 can be provided at a position separated from board production line 1, and can supply article AR0 to multiple board production lines 1 and collect article AR0 from multiple board production lines 1.

In addition, for example, article moving device 40 can use an unmanned conveyance vehicle. The unmanned conveyance vehicle is an automatic guided vehicle (AGV) that can perform self-traveling without requiring a driving manipulation by the worker. The unmanned conveyance vehicle, which is article moving device 40, can travel, for example, between the storage device provided at a position separated from board production line 1 and board work machine WM (for example, component mounter 10). It should be noted that in the unmanned conveyance vehicle, multiple traveling routes may be assumed.

In addition, in a case in which multiple unmanned conveyance vehicles travel, the priority may be set in multiple unmanned conveyance vehicles. For example, the priority of the unmanned conveyance vehicle that conveys article AR0 due to the occurrence of the shortage of article AR0 is set higher than the priority of the unmanned conveyance vehicle that conveys article AR0 for the changeover. In addition, in a case in which the storage device supplies article AR0 to multiple board production lines 1, the priority of the unmanned conveyance vehicle may be set depending on the production priority in board production line 1 which is a conveyance destination. Further, the priority of the unmanned conveyance vehicle that supplies article AR0 is set higher than the priority of the unmanned conveyance vehicle that collects article AR0. As described above, in a case in which article moving device 40 is the unmanned conveyance vehicle, simulation section 51 can simulate the operating status of board work machine WM and the operating status of article moving device 40, including the traveling route and the priority of the unmanned conveyance vehicle, the operating statuses of other unmanned conveyance vehicles, the operating statuses of other board production lines 1, and the like.

3. Simulation Method

It is also possible to similarly apply the above description of simulation device 50 to the simulation method. Specifically, the simulation method includes a simulation step and a calculation step. The simulation step corresponds to the control performed by simulation section 51. The calculation step corresponds to the control performed by calculation section 52.

4. Example of Effects of Embodiments

Simulation device 50 includes simulation section 51 and calculation section 52. Accordingly, simulation device 50 can calculate production stop time TW0 of board work machine WM caused by the wait time from when the production of the board product by board work machine WM is stopped to when article AR0 is supplied by article moving device 40. It is also possible to similarly apply the above description of simulation device 50 to the simulation method.

REFERENCE SIGNS LIST

5: storage device, 40: article moving device, 50: simulation device, 51: simulation section, 52: calculation section, 90: board, 121: first slot, 122: second slot, AR0: article, LC0: management device, TC0: carrying-out time, TF0: first supply time, TS0: second supply time, TW0: production stop time, WM: board work machine

The invention claimed is:
1. A simulation device comprising:
a simulation section configured to simulate an operating status of a board work machine configured to perform predetermined board work on a board and produce a board product, and an operating status of an article moving device configured to supply an article needed for production of the board product to the board work machine based on a production plan of the board product; and
a calculation section configured to calculate a production stop time of the board work machine caused by a wait time from when production of the board product by the board work machine is stopped to when the article is supplied by the article moving device based on a result of simulation by the simulation section.
2. The simulation device according to claim 1,
wherein the board work machine includes a first slot configured to hold the article used for production of the board product in an exchangeable manner, and a second slot configured to preliminarily hold the article or temporarily hold the article to be collected,
the article moving device is configured to perform an exchange operation of the article between the first slot and the second slot, and
the calculation section is configured to calculate the production stop time based on a carrying-out time needed from when production of the board product by the board work machine is stopped to when the article moving device carries the article, which is no longer needed in the board work machine, out of the first slot, and a first supply time needed from when the article moving device starts carrying-out of the article held by the second slot to when the article moving device carries the article into the first slot.
3. The simulation device according to claim 1,
wherein the board work machine includes a first slot configured to hold the article used for production of the board product in an exchangeable manner, and a second slot configured to preliminarily hold the article or temporarily hold the article to be collected,
the article moving device is configured to perform an exchange operation of the article between the first slot and the second slot, and
the calculation section is configured to calculate the production stop time based on a carrying-out time needed from when production of the board product by the board work machine is stopped to when the article moving device carries the article, which is no longer needed in the board work machine, out of the first slot, and a second supply time needed from when the article moving device starts an acquisition operation of the article stored in a storage device to when the article moving device conveys the acquired article to the board work machine to which the article is to be supplied and carries the article into the first slot of the board work machine when the second slot is not able to hold the article before production of the board product by the board work machine is stopped.
4. The simulation device according to claim 1,
wherein a stop of production of the board product by the board work machine occurs due to a shortage of the article or a changeover in the board work machine.
5. The simulation device according to claim 1,
wherein the calculation section is configured to further calculate a first operating ratio of the board work machine when the production stop time is zero, and a second operating ratio of the board work machine at the calculated production stop time.
6. The simulation device according to claim 1,
wherein the calculation section is configured to further calculate an operating time of the article moving device.
7. The simulation device according to claim 1,
wherein the calculation section is configured to, for a case in which a worker supplies the article needed for production of the board product to the board work machine in a board production line in which the article moving device is not provided, acquire the production stop time of the board work machine caused by the wait time from when production of the board product by the board work machine is stopped to when the article is supplied by the worker, as comparative data.
8. The simulation device according to claim 1,
wherein the simulation section is configured to acquire the production plan from a management device configured to manage the production plan including at least a type and a production scheduled number of the board products, and a type and a needed number of the articles, and perform a simulation based on the acquired production plan.
9. The simulation device according to claim 1,
wherein the simulation section is configured to cause an operator to input the production plan including at least a type and a production scheduled number of the board products, and a type and a needed number of the articles, and perform a simulation based on the production plan input by the operator.
10. A simulation method comprising:
a simulation step of simulating an operating status of a board work machine configured to perform predetermined board work on a board and produce a board product, and an operating status of an article moving device configured to supply an article needed for production of the board product to the board work machine based on a production plan of the board product; and a calculation step of calculating a production stop time of the board work machine caused by a wait time from when production of the board product by the board work machine is stopped to when the article is supplied by the article moving device based on a result of simulation in the simulation step.

\* \* \* \* \*